US012315369B2

(12) United States Patent
Hayakawa

(10) Patent No.: US 12,315,369 B2
(45) Date of Patent: May 27, 2025

(54) VEHICLE NOTIFICATION DEVICE, VEHICLE NOTIFICATION METHOD, AND STORAGE MEDIUM

(71) Applicant: TOYOTA JIDOSHA KABUSHIKI KAISHA, Toyota (JP)

(72) Inventor: Tetsuo Hayakawa, Kurokawa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/462,999

(22) Filed: Sep. 7, 2023

(65) Prior Publication Data

US 2024/0161612 A1 May 16, 2024

(30) Foreign Application Priority Data

Nov. 15, 2022 (JP) ................................ 2022-182930

(51) Int. Cl.
*G08G 1/0967* (2006.01)
*G08G 1/01* (2006.01)

(52) U.S. Cl.
CPC ......... *G08G 1/0967* (2013.01); *G08G 1/0137* (2013.01)

(58) Field of Classification Search
CPC .......................... G08G 1/0967; G08G 1/0137
See application file for complete search history.

(56) References Cited

FOREIGN PATENT DOCUMENTS

| | | | | | |
|---|---|---|---|---|---|
| CN | 114419886 | A | * | 4/2022 | .......... G08G 1/0125 |
| CN | 115131054 | A | * | 9/2022 | ............ B60W 40/08 |
| JP | 2007-093462 | A | | 4/2007 | |
| JP | 4159974 | B2 | * | 10/2008 | |
| JP | 2019158594 | A | * | 9/2019 | |
| JP | 2023068848 | A | * | 5/2023 | |
| WO | WO-2018230496 | A1 | * | 12/2018 | ............ G01C 21/32 |

* cited by examiner

*Primary Examiner* — Curtis A Kuntz
*Assistant Examiner* — James E Munion
(74) *Attorney, Agent, or Firm* — Oliff PLC

(57) ABSTRACT

A vehicle notification device acquires a congestion situation of rest facilities existing on a guidance route on an expressway, acquires position information of a first rest facility that is the closest rest facility to a current location of an own vehicle and position information of a second rest facility that is the next closest rest facility to the current location following the first rest facility, among rest facilities for which determination is made that a rest is possible from the congestion situation, predicts time required to move from the first rest facility to the second rest facility, and when the time is more than a preset threshold value, performs notification prompting a rest at the first rest facility.

6 Claims, 6 Drawing Sheets

VEHICLE NOTIFICATION DEVICE, VEHICLE NOTIFICATION METHOD, AND STORAGE MEDIUM

CROSS-REFERENCE TO RELATED APPLICATION

This application claims priority to Japanese Patent Application No. 2022-182930 filed on Nov. 15, 2022, incorporated herein by reference in its entirety.

BACKGROUND

1. Technical Field

The present disclosure relates to a vehicle notification device, a vehicle notification method, and a storage medium.

2. Description of Related Art

An information processing device is disclosed in Japanese Unexamined Patent Application Publication No. 2019-158594 (JP 2019-158594 A). The information processing device generates congestion information of a destination facility when a required time for arriving at the facility from a current position is a predetermined value or less, and generates predicted congestion information when the required time for arriving is more than the predetermined value.

SUMMARY

However, the information processing device cannot cope with situations such as a sudden need to go to the bathroom, by simply predicting the congestion situation on expressways such as highways, and there is room for improvement from the viewpoint of improving the convenience for occupants.

The present disclosure provides a vehicle notification device, a vehicle notification method, and a storage medium that are able to improve the convenience for an occupant of a vehicle traveling on an expressway.

A vehicle notification device according to an embodiment is configured to acquire a congestion situation of rest facilities existing on a guidance route on an expressway, acquire position information of a first rest facility that is the closest rest facility to a current location of an own vehicle and position information of a second rest facility that is the next closest rest facility to the current location following the first rest facility, among rest facilities for which determination is made that a rest is possible from the congestion situation, predict time required to move from the first rest facility to the second rest facility; and when the time is more than a preset threshold value, perform notification prompting a rest at the first rest facility.

By vehicle notification device according to an embodiment, it is possible to determine whether a rest is possible at the rest facility, by acquiring the congestion situation of the rest facility existing on the guidance route on the expressway. Further, the time required (required time) is predicted for moving from the first rest facility that is the closest rest facility to the current location of an own vehicle to the second rest facility that is the next closest rest facility to the current location of the own vehicle among the rest facilities for which determination is made that a rest is possible. When the time is more than the preset threshold value, notification prompting the occupant to take a rest at the first rest facility is performed. This enables the occupant to use the bathroom etc. at the first rest facility, avoiding a situation in which the occupant wants to go to the bathroom when moving to the second rest facility.

In the vehicle notification device according to an embodiment, the threshold value is able to be changed by an operation of an occupant.

In the vehicle notification device according to an embodiment, when the occupant feels annoyed by frequent notifications, the threshold value can be changed to a larger value. Conversely, by changing the threshold value to a smaller value, the rest intervals can be shortened.

The vehicle notification device according to an embodiment is configured to determine whether occupants include a child, and when a child is included, lower the threshold value compared to a case where a child is not included.

In the vehicle notification device according to an embodiment, since children go to the bathroom more frequently than adults, it is possible to avoid situations in which the child suddenly wants to go to the bathroom, by lowering the threshold value when a child is included. The term “child” used herein is a concept that includes a wide range of occupants who are of age and body type generally referred to as those of a child.

The vehicle notification device according to an embodiment is configured to acquire parking lot information of the rest facilities existing on a guidance route, and determine that a rest is possible when there is a space in which parking is possible in a parking lot from the parking lot information.

In the vehicle notification device according to an embodiment, a situation in which the vehicle cannot be parked can be avoided by determining a facility at which a parking is possible as a facility at which a rest is possible.

The vehicle notification device according to an embodiment is configured to acquire image information of an entrance of each of the rest facilities existing on a guidance route, and determine that a rest is possible when the entrance is accessible.

In the vehicle notification device according to an embodiment, even in a situation where the vehicle cannot be parked, when the facility is accessible, another passenger can use the bathroom. Therefore, a situation where the another passenger cannot wait to use the bathroom can be avoided by determining that a rest is possible when the entrance is accessible.

A vehicle notification method according to an embodiment includes acquiring a congestion situation of rest facilities existing on a guidance route on an expressway, acquiring position information of a first rest facility that is the closest rest facility to a current location of an own vehicle and position information of a second rest facility that is the next closest rest facility to the current location following the first rest facility, among rest facilities for which determination is made that a rest is possible from the congestion situation, predicting time required to move from the first rest facility to the second rest facility; and when the time is more than a preset threshold value, performing notification prompting a rest at the first rest facility.

A storage medium storing a program according to an embodiment causes a computer to execute processes including acquiring a congestion situation of rest facilities existing on a guidance route on an expressway, acquiring position information of a first rest facility that is the closest rest facility to a current location of an own vehicle and position information of a second rest facility that is the next closest rest facility to the current location following the first rest facility, among rest facilities for which determination is made that a rest is possible from the congestion situation, predicting time required to move from the first rest facility to the second rest facility; and when the time is more than a preset threshold value, performing notification prompting a rest at the first rest facility.

As described above, according to the vehicle notification device, the vehicle notification method, and the storage medium according to the present disclosure, it is possible to improve the convenience for the occupant of the vehicle traveling on the expressway.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle notification system S including a vehicle notification device 10 according to an embodiment will be described with reference to the drawings.

Figure 1:
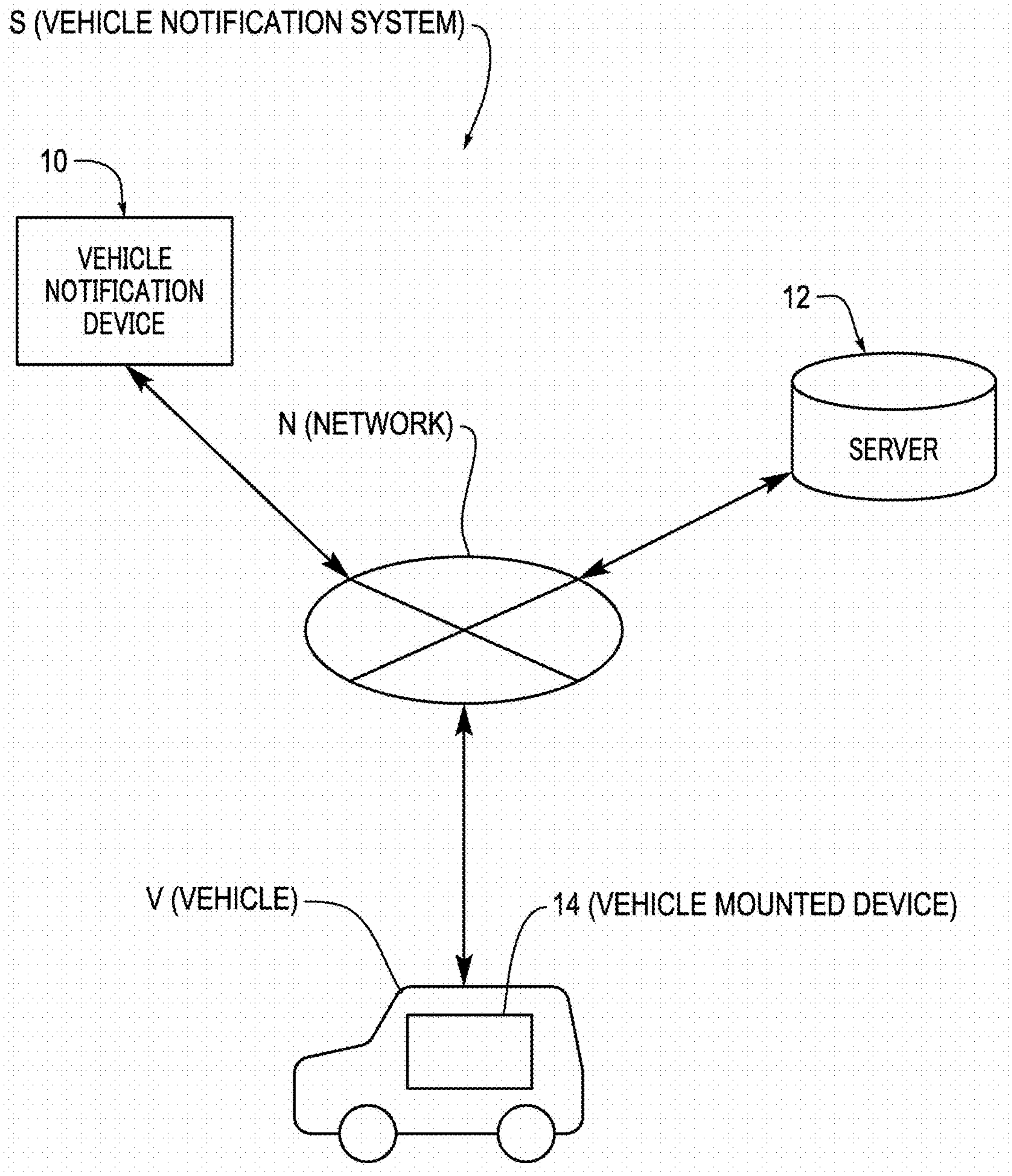
FIG. 1 is a schematic view showing an overall configuration of a vehicle notification system according to an embodiment.

As shown in FIG. 1, the vehicle notification system S of the present embodiment includes the vehicle notification device 10, a server 12, and a vehicle V provided with a vehicle-mounted device 14. The vehicle notification device 10, the server 12, and the vehicle-mounted device 14 are connected by a network N. Although a plurality of vehicles V is connected to the network N, only one vehicle V is shown in FIG. 1 for convenience of explanation.

As an example, the vehicle notification device 10 of the present embodiment is an information processing device provided outside the vehicle V. The server 12 is provided outside the vehicle V, and stores information related to a rest facility on an expressway etc. For example, the server 12 stores data related to a congestion situation of a plurality of rest facilities existing on the expressway, and the data related to the congestion situation is updated periodically.

Further, the server 12 may store image data obtained by imaging an entrance of the rest facility. For example, the image data may be satellite data acquired from a satellite, or image data captured by a camera or the like installed at the entrance of the rest facility. Furthermore, instead of the image data, the server 12 may store only data indicating whether traffic congestion has occurred near the entrance of the rest facility.

The vehicle-mounted device 14 mounted on the vehicle V is, for example, an electronic control unit (ECU), and may be a device that performs control of the vehicle V etc. A display device 58 is provided in the vehicle cabin of the vehicle V for notifying an occupant of information (see FIG. 3). In FIG. 1, the size of the vehicle-mounted device 14 is exaggerated for convenience of explanation.

Here, the vehicle notification system S of the present embodiment is configured to acquire the congestion situation of the rest facilities existing on a guidance route on the expressway, and to perform predetermined notification when a required time from the closest rest facility to the next closest facility among the rest facilities that a rest is possible is more than a threshold value.

Hardware Configuration of Vehicle Notification Device 10

Figure 2:
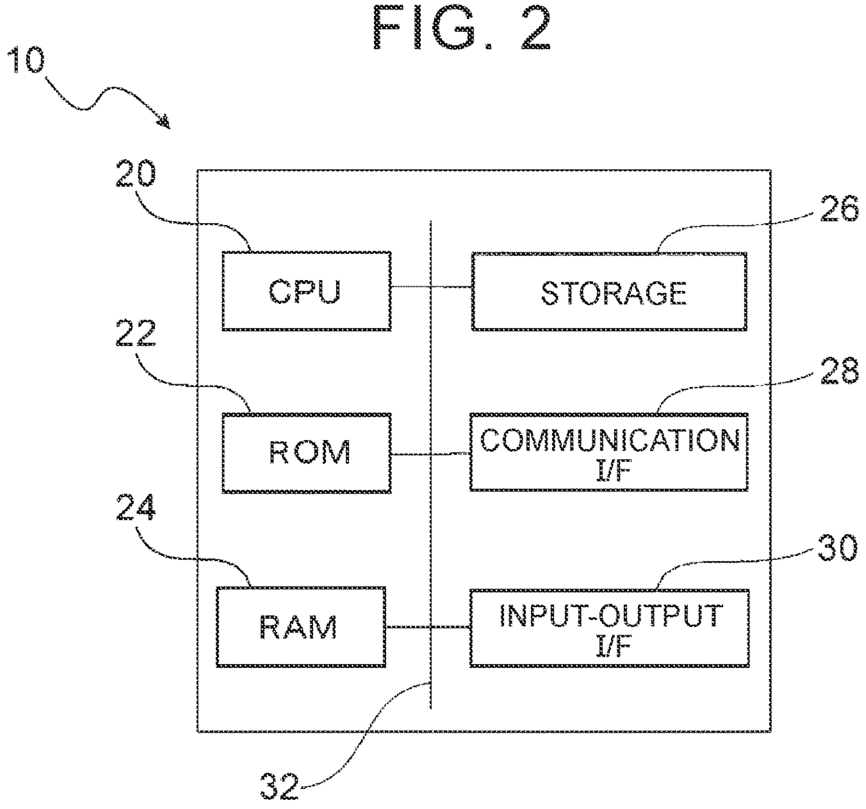
FIG. 2 is a block diagram showing a hardware configuration of a vehicle notification device according to the embodiment.

FIG. 2 is a block diagram showing a hardware configuration of the vehicle notification device 10. As shown in FIG. 2, the vehicle notification device 10 is configured to include a central processing unit (CPU: processor) 20, a read-only memory (ROM) 22, a random access memory (RAM) 24, a storage 26, a communication interface (communication I/F) 28, and an input-output interface (input-output UF). The configurations are connected to each other so as to be able to communicate with each other via a bus 32.

The CPU 20 is a central processing unit that executes various programs and that controls various units. That is, the CPU 20 reads a program from the ROM 22 or the storage 26 and executes the program using the RAM 24 as a work area. The CPU 20 controls each of the above configurations and executes various arithmetic processes in accordance with the program recorded in the ROM 22 or the storage 26.

The ROM 22 stores various programs and various data. The RAM 24 temporarily stores a program or data as a work area. The storage 26 is composed of a hard disk drive (HDD) or a solid state drive (SSD), stores various programs including an operating system, and stores various data. In the present embodiment, the ROM 22 or the storage 26 stores a notification program for notifying the occupant, various data, and the like.

The communication OF 28 is an interface used for the vehicle notification device 10 to communicate with the server 12 and other devices, and for example, standards such as a controller area network (CAN), Ethernet (registered trademark), long term evolution (LTE), fiber distributed data interface (FDDI), and Wi-Fi (registered trademark) are used. The input-output OF 30 is electrically connected to peripheral devices, and communication is performed between the peripheral devices and the vehicle notification device 10 via the input-output OF 30.

Hardware Configuration of Vehicle-Mounted Device 14

Figure 3:
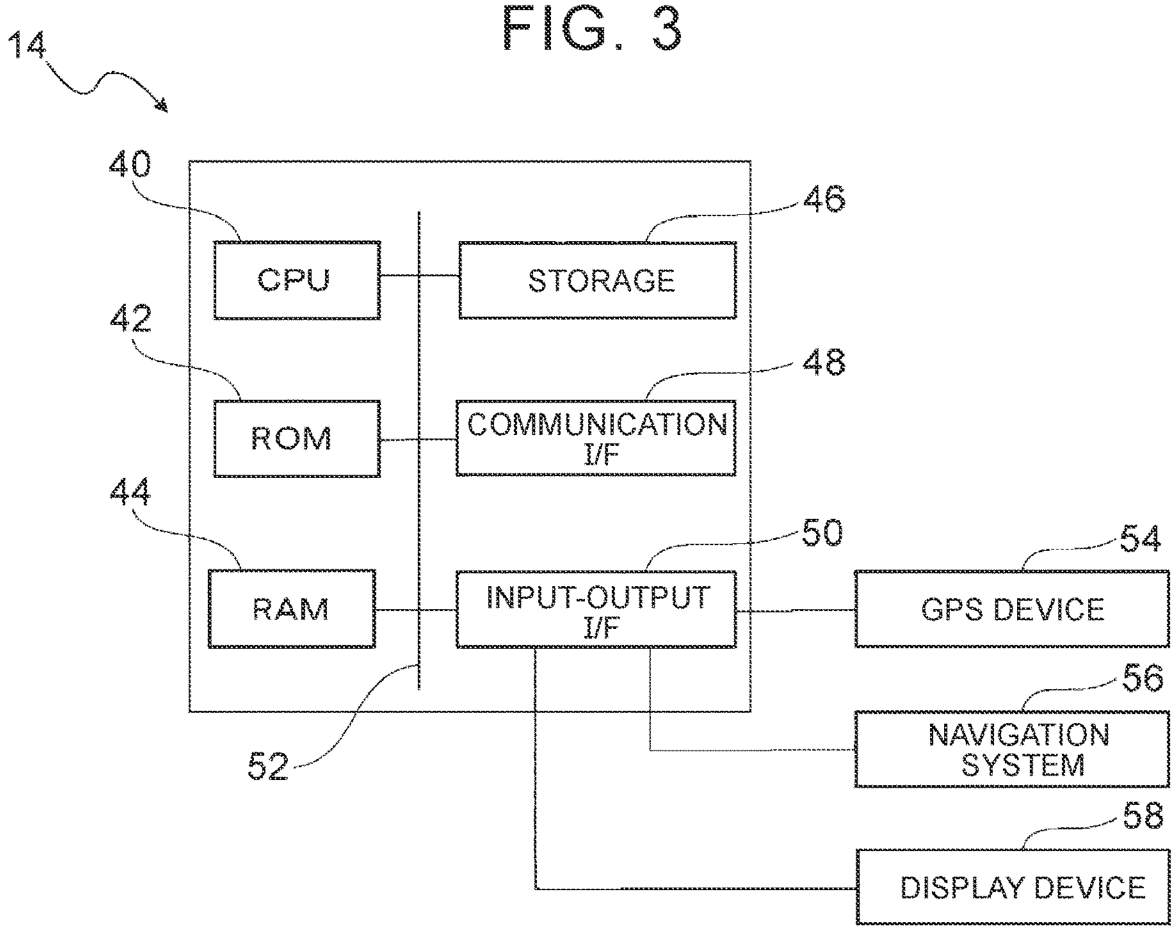
FIG. 3 is a block diagram showing a hardware configuration of a vehicle-mounted device according to the embodiment.

FIG. 3 is a block diagram showing the hardware configuration of the vehicle-mounted device 14. As shown in FIG. 3, the vehicle-mounted device 14 is configured to include a CPU (processor) 40, a ROM 42, a RAM 44, a storage 46, a communication OF 48, and an input-output OF 50. The configurations are connected to each other so as to be able to communicate with each other via a bus 52.

The CPU 40 is a central processing unit, and executes various programs and controls various units. That is, the CPU 40 reads a program from the ROM 42 or the storage 46 and executes the program using the RAM 44 as a work area. The CPU 40 controls each of the above configurations and executes various arithmetic processes in accordance with the program recorded in the ROM 42 or the storage 46.

The ROM 42 stores various programs and various data. The RAM 44 temporarily stores programs or data as a work area. The storage 46 is composed of an HDD or an SSD, stores various programs including an operating system, and stores various data.

The communication OF 48 is an interface used for the vehicle-mounted device 14 to communicate with the server 12 and other devices, and standards such as CAN, Ethernet (registered trademark), LTE, FDDI, and Wi-Fi (registered trademark) are used.

The input-output OF 50 is electrically connected to a global positioning system (GPS) device 54, a navigation system 56, and the display device 58.

The GPS device 54 is a device that receives position information such as the current location of the vehicle V positioned by a plurality of GPS satellites. The navigation system 56 is a device that calculates a guidance route to a destination set by an occupant.

The display device 58 is provided, for example, in the front portion of the vehicle cabin, and is a device that displays various information for the occupant. The display device 58 includes a center display provided on the instrument panel, a head-up display device that projects an image forward of the driver's seat, and the like. In particular, in the present embodiment, the display device 58 displays the guidance route calculated by the navigation system 56. Further, the display device 58 performs notification to the occupant under a predetermined condition.

Functional Configuration of Vehicle Notification Device 10

The vehicle notification device 10 realizes various functions using the hardware resources shown in FIG. 2. The functional configuration realized by the vehicle notification device 10 will be described with reference to FIG. 4.

Figure 4:
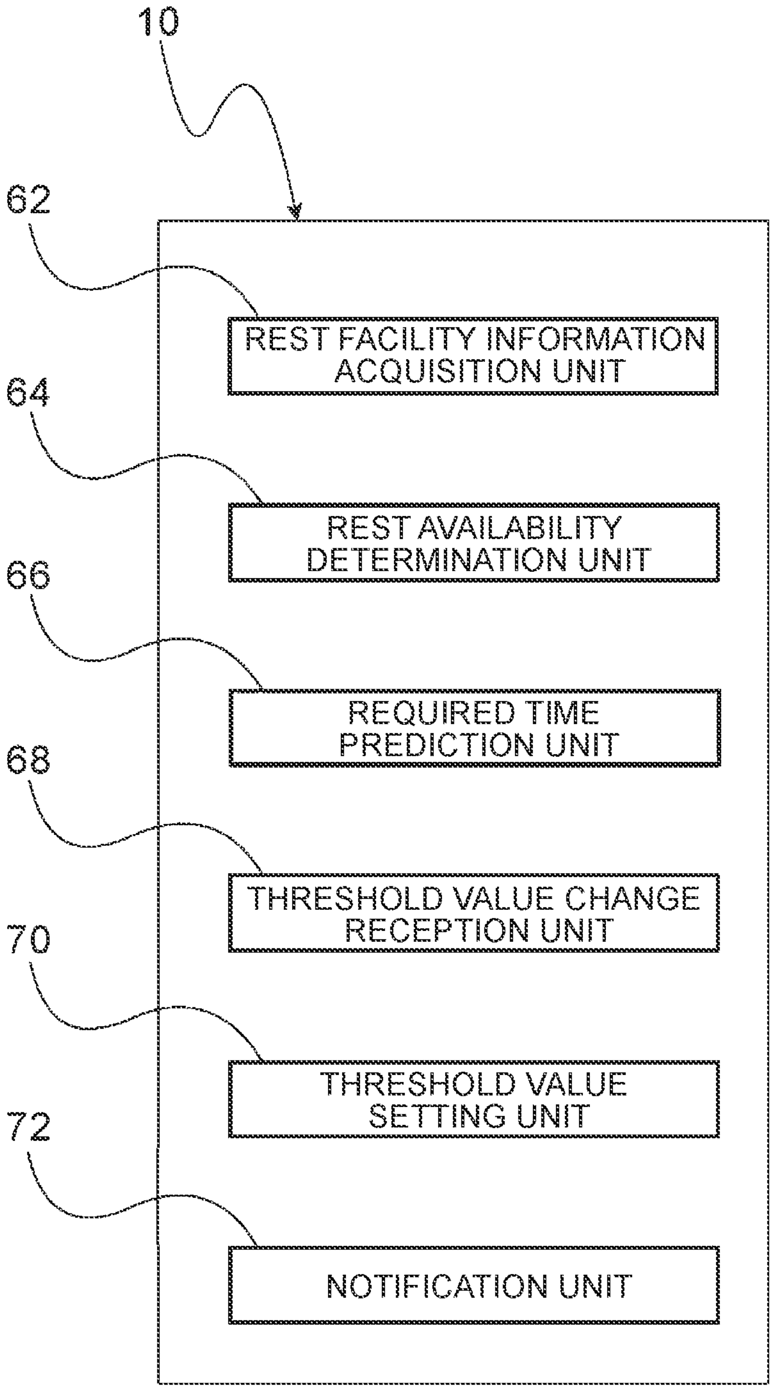
FIG. 4 is a block diagram showing a functional configuration of the vehicle notification device according to the embodiment.

As shown in FIG. 4, the vehicle notification device 10 includes, as the functional configuration, a rest facility information acquisition unit 62, a rest availability determination unit 64, a required time prediction unit 66, a threshold value change reception unit 68, a threshold value setting unit 70, and a notification unit 72. Each functional configuration is realized as the CPU 20 reads and executes the program stored in the ROM 22 or the storage 26.

The rest facility information acquisition unit 62 acquires the congestion situation of rest facilities existing on the guidance route on the expressway. For example, in FIG. 5, when there are rest facilities A to E on the guidance route of the vehicle V, the rest facility information acquisition unit 62 acquires the congestion situation of the rest facilities from the rest facilities A to E.

Figure 5:
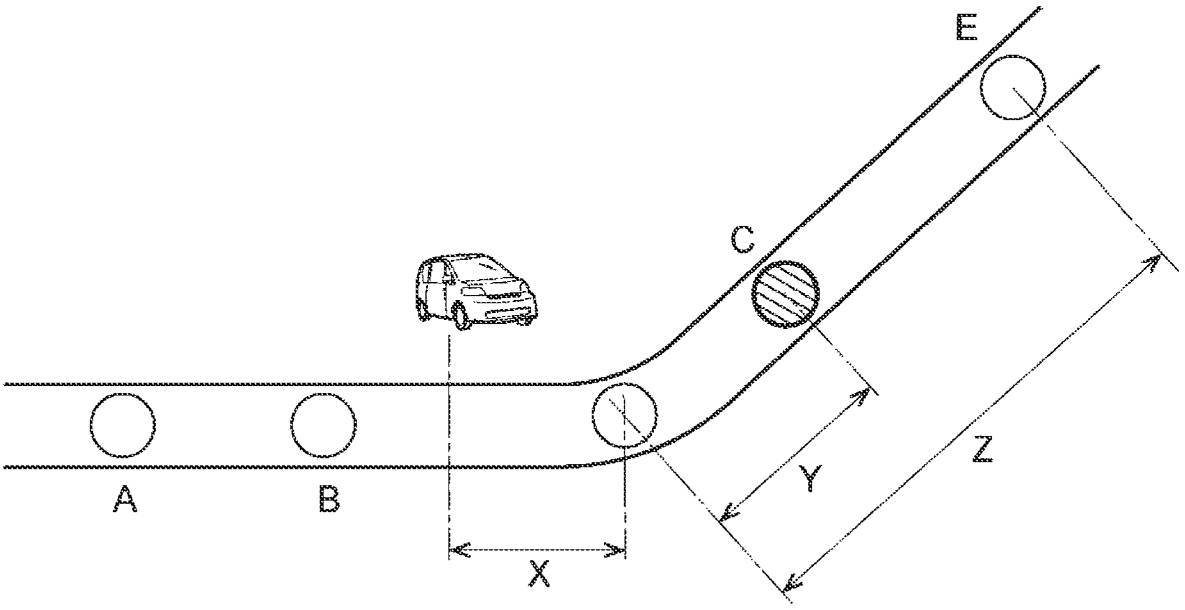
FIG. 5 is a schematic view showing a current position of a vehicle and rest facilities on a guidance route.

FIG. 5 shows a situation in which the vehicle V is traveling between the rest facility B and the rest facility C. Therefore, the rest facility information acquisition unit 62 acquires the congestion situation of the rest facilities from the rest facilities C to E. For example, the rest facility information acquisition unit 62 may access the server 12, acquire the latest congestion situation of each rest facility from the server 12, and change the display mode of the rest facilities according to the congestion situation.

The rest availability determination unit 64 shown in FIG. 4 determines whether a rest is possible or a rest is not possible at each rest facility based on the data related to the congestion situation acquired by the rest facility information acquisition unit 62. For example, the rest availability determination unit 64 may acquire parking lot information of the rest facilities existing on the guidance route, and may determine that a rest is possible when there is a space in which parking is possible in the parking lot from the parking lot information. Further, for example, the rest availability determination unit 64 may acquire image information of the entrance of the rest facilities existing on the guidance route, and may determine that a rest is possible when the entrance is accessible. In this case, even when the parking lot of the rest facility is full, it is determined that a rest is possible when the entrance is accessible. Here, in FIG. 5, since the parking lot of the rest facility D is full, the display mode thereof is different from that of other rest facilities.

The required time prediction unit 66 shown in FIG. 4 acquires the position information of a first rest facility closest to the current location of the vehicle V and the position information of a second rest facility that is the next closest rest facility following the first rest facility among the rest facilities for which a determination is made that a rest is possible from the congestion situation, and predicts the time required for moving from the first rest facility to the second rest facility (required time).

For example, in FIG. 5, since the vehicle V is traveling between the rest facility B and the rest facility C, the rest facility C is set as the first rest facility closest to the current location of the vehicle V. Further, since the rest availability determination unit 64 determines that a rest is not possible at the rest facility D, the rest facility E is set as the second rest facility that is the next closest rest facility following the first rest facility.

Here, in FIG. 5, when X is set as the distance from the current position of the vehicle V to the rest facility C, Y is set as the distance from the rest facility C to the rest facility D, and Z is set as the distance from the rest facility C to the rest facility E, the required time prediction unit 66 predicts the time required for moving the distance Z. For example, the required time prediction unit 66 may predict the required time from the average speed of the vehicle V and the distance Z. Further, the required time prediction unit 66 may, for example, predict the required time for the distance Z in consideration of information such as the congestion situation of a road from the rest facility C to the rest facility E, the gradient of the road, and the number of lanes, with respect to the average speed of the vehicle V and the distance Z.

The threshold value change reception unit 68 receives a change of the threshold value. Here, the threshold value is a threshold value of required time that serves as a standard for notification, and is set, for example, to a range from 20 minutes to 180 minutes. For example, when the occupant executes an operation to change the threshold value, the threshold value change reception unit 68 receives the change of the threshold value. Further, when the threshold value desired by the occupant is smaller than 20 minutes or larger than 180 minutes, the threshold value change reception unit 68 need not receive the change of the threshold value and may perform the predetermined notification for the occupant.

The threshold value setting unit 70 shown in FIG. 4 sets a preset initial value as the threshold value. For example, the threshold value setting unit 70 may set the threshold value to the initial value each time the vehicle V is started. Further, for example, the threshold value setting unit 70 may maintain the previously set threshold value when the vehicle V is started. Furthermore, when a change of the threshold value is received by the threshold value change reception unit 68, the threshold value setting unit 70 updates the threshold value to the received threshold value.

Moreover, the threshold value setting unit 70 may change the set threshold value when a predetermined condition is satisfied. For example, when it is determined that a child is included in the occupants by a camera or the like provided in the vehicle cabin, the threshold value setting unit 70 may change the threshold value to a smaller value than the value when no child is included. Here, various methods can be adopted to determine whether the occupant is a child. For example, whether the occupant is a child may be determined by capturing an image of the occupant using the camera provided in the vehicle cabin, and detecting the body shape of the occupant from the image data. Further, for example, the face of the occupant may be detected from the image data, and it may be determined that the occupant is a child when a feature peculiar to the child's face is detected.

The term "child" used herein is not limited to a child under the age legally considered to be an adult, but is a concept that includes a wide range of occupants who are of age and body type generally referred to as those of a child. For example, an occupant whose age is considered to require more frequent rest than an adult may be determined as a child.

When the time required for moving from the first rest facility to the second rest facility is more than the threshold value, the notification unit 72 performs notification to prompt the occupant to take a rest at the first rest facility. For example, a case is considered in FIG. 5 that the required time to reach the rest facility C that is the first rest facility is predicted to be 15 minutes, and the required time to move from the rest facility C to the rest facility E that is the second rest facility is predicted to be 60 minutes. At this time, when the threshold value is set to 30 minutes, the required time from the rest facility C to the rest facility E is more than the threshold value. Therefore, the notification unit 72 performs the predetermined notification. On the other hand, when the threshold value is set to 70 minutes, the required time from the rest facility C to the rest facility E is less than the threshold value. Therefore, the notification unit 72 does not perform notification.

Notification to the occupant is performed by various methods, but in the present embodiment, as an example, notification to the occupant is performed by the predetermined display on a display area in the vehicle cabin using the display device 58. An example of notification by the notification unit 72 will be described with reference to FIGS. 6 and 7.

Figure 6:
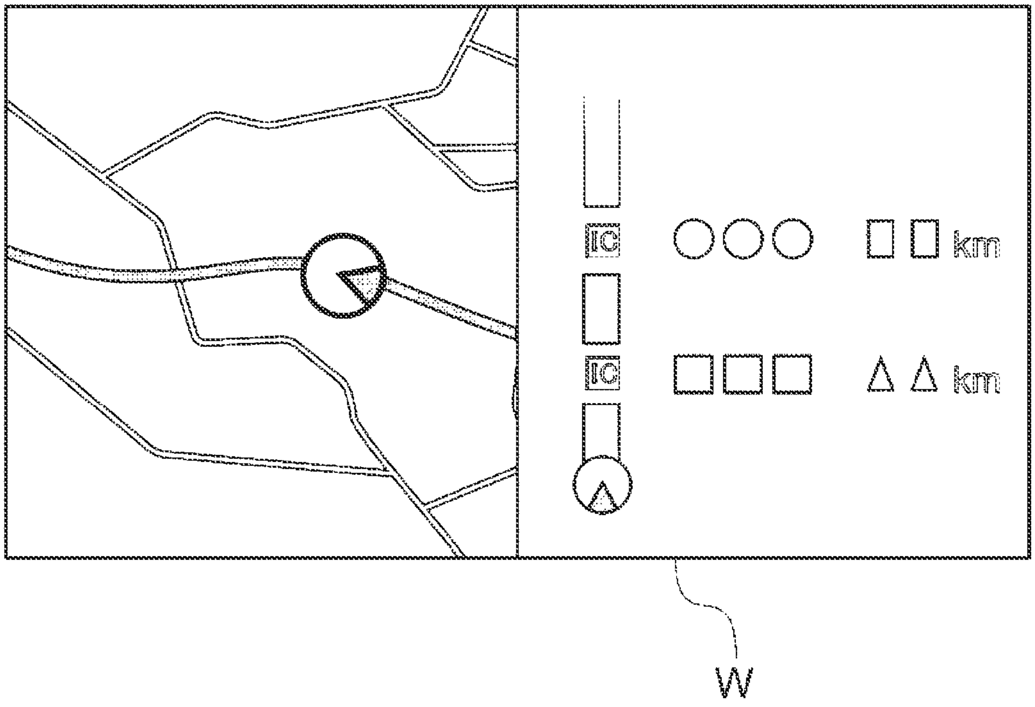
FIG. 6 is an example of a display screen in the embodiment, and is a diagram showing a state before notification is performed.

FIG. 6 shows an example of a display screen displayed on a display area W by the display device 58. Specifically, FIG. 6 is a display example in a state where the vehicle V is traveling on an expressway. In the left half of the display area W, the current position of the vehicle V and map information are displayed. In the right half of the display area W, information on rest facilities existing on the guidance route is displayed. Specifically, rest facilities are displayed in order from the closest rest facility to the current position of the vehicle V. The display area W displays the name of the rest facility, the distance to the rest facility, the required time to the rest facility, and the like.

Figure 7:
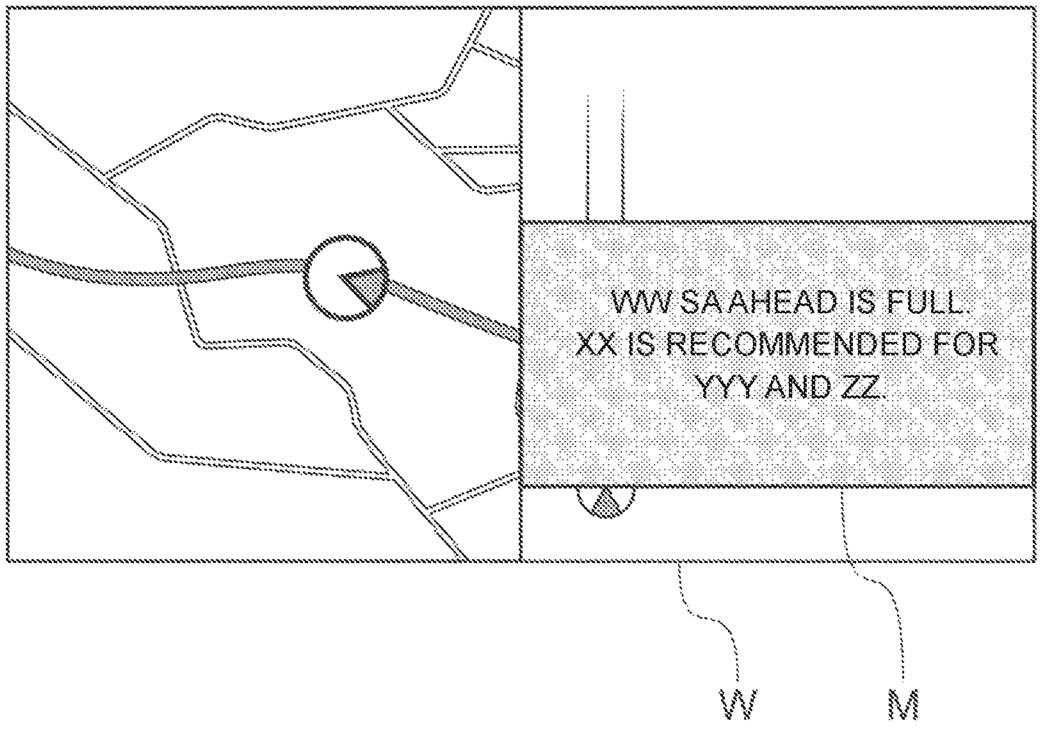
FIG. 7 is an example of the display screen in the embodiment, and is a diagram showing a state when the notification is performed.

FIG. 7 shows an example of the display screen in a state where the notification is performed by the notification unit 72. A message window M is displayed on the right side of the display area W, as shown in FIG. 7. The message window M displays information on a rest facility at which a rest is not possible, and a message prompting the occupant to take a rest at the nearest rest facility.

Effect

Next, the effect of the present embodiment will be described.

Notification Process

Figure 8:
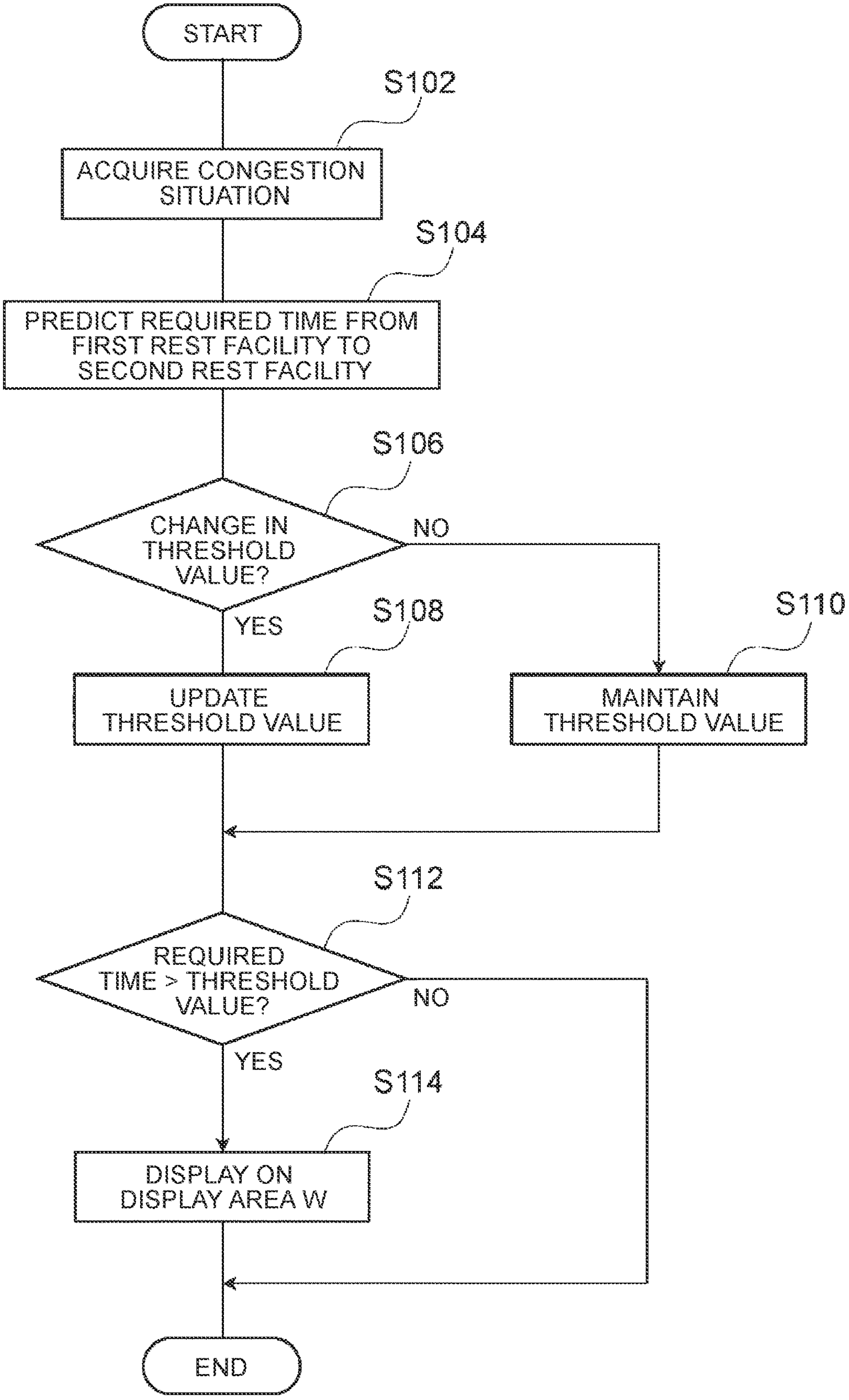
FIG. 8 is a flowchart showing an example of a flow of a vehicle notification process in the embodiment.

An example of the flow of a notification process by the vehicle notification device 10 will be described with reference to the flowchart shown in FIG. 8. The present process is realized as the CPU 20 reads and executes the program stored in the ROM 22 or the storage 26. Further, in the present embodiment, when the vehicle V starts traveling on an expressway, the notification process is executed at predetermined intervals, as an example.

In step S102, the CPU 20 acquires the congestion situation of the rest facilities. Specifically, the CPU 20 acquires the congestion situation of rest facilities existing on the guidance route on the expressway, by a function of the rest facility information acquisition unit 62.

In step S104, the CPU 20 predicts the required time from the first rest facility to the second rest facility. Specifically, the CPU 20 acquires the position information of the first rest facility that is the closest rest facility to the current location of the vehicle V and the position information of the second rest facility that is the next closest rest facility to the current location of the vehicle V, among the rest facilities for which a determination is made that a rest is possible by a function of the rest availability determination unit 64. Then, the CPU 20 predicts the time required for moving from the first rest facility to the second rest facility by a function of the required time prediction unit 66.

The CPU 20 determines in step S106 whether there is a change in the threshold value. Specifically, the CPU 20 determines that there is a change in the threshold value when the change of the threshold value is received by a function of the threshold value change reception unit 68. Further, the CPU 20 determines that there is a change in the threshold value when a child is included in the occupants.

When the determination that there is a change in the threshold value is made in step S106, the CPU 20 proceeds to the process of step S108 and updates the threshold value. For example, the CPU 20 changes the threshold value to the received threshold value, when the change of the threshold value is received by the function of the threshold value change reception unit 68. Further, the CPU 20 changes the threshold value to a preset threshold value when a child is included in the occupants, for example. Then, the process proceeds to step S112.

On the other hand, when determination is not made that there is a change in the threshold value in step S106, that is, when there is no change in the threshold value, the CPU 20 proceeds to the process of step S110, and proceeds to the process of step S112 while maintaining the current threshold value.

In step S112, the CPU 20 determines whether the required time predicted in step S104 is more than the threshold value. When determination is made that the required time is more than the threshold value, the process proceeds to step S114, and display is performed on the display area W. Specifically, a function of the notification unit 72 performs notification prompting the occupant to take a rest at the first rest facility (see FIG. 7).

On the other hand, when determination is made in step S112 that the required time is equal to or less than the threshold value, the CPU 20 terminates the notification process without performing notification.

As described above, by the vehicle notification device 10 according to the present embodiment, it is possible to determine whether a rest is possible at the rest facility, by acquiring the congestion situation of the rest facility existing on the guidance route on the expressway. Further, the time required is predicted for moving from the first rest facility that is the closest rest facility to the current location of an own vehicle to the second rest facility that is the next closest rest facility to the current location of the own vehicle, among the rest facilities for which it is determined that a rest is possible. When the time is more than the preset threshold value, notification prompting the occupant to take a rest at the first rest facility is performed. This enables the occupant to use the bathroom etc. at the first rest facility, and avoids a situation in which the occupant wants to go to the bathroom when moving to the second rest facility. As a result, it is possible to improve the convenience for the occupant of the vehicle traveling on the expressway.

Further, in the present embodiment, the occupant is configured to be able to change the threshold value. Therefore, when the occupant feels annoyed by frequent notifications, the occupant can change the threshold value to a larger value. Conversely, when the occupant changes the threshold value to a smaller value, the rest intervals can be shortened, and the physical condition can be appropriately managed even during long-distance driving.

Furthermore, in the present embodiment, since children go to the bathroom more frequently than adults, it is possible to avoid situations in which the child suddenly wants to go to the bathroom, by lowering the threshold value when a child is included.

Moreover, in the present embodiment, a situation in which the vehicle V cannot be parked can be avoided by determining a facility at which a parking is possible as a rest facility at which a rest is possible.

On the other hand, even in a situation where the vehicle V cannot be parked, when the facility is accessible, another passenger can use the bathroom. Therefore, a situation where the another passenger cannot wait to use the bathroom can be avoided by determining that a rest is possible when the entrance is accessible.

The vehicle notification device 10 according to the present embodiment has been described above. However, it is understood that the vehicle notification device 10 can be implemented in various modes without departing from the scope of the present disclosure. For example, in the above-described embodiment, the notification unit 72 notifies the occupant by performing display on the display area W in the vehicle cabin by the display device 58, but the present disclosure is not limited to this. That is, in addition to the display on the display area W, notification may be performed to the occupant by audio.

Further, in the above-described embodiment, the rest availability determination unit 64 determines that a rest is possible when there is a space in which parking is possible in the parking lot, but the present disclosure is not limited to this. For example, based on the scheduled arrival time of the vehicle V at the rest facility, the rest availability determination unit 64 may determine that a rest is possible when there is a high possibility that the parking lot will be available at the scheduled time. In this case, it may be predicted that there is a high possibility that the parking lot will become available from statistical information such as the usage rate of the parking lot based on information such as the time, the season, and the weather.

Furthermore, in the above-described embodiment, the threshold value setting unit 70 is configured to decrease the threshold value when determination is made that a child is included in the occupants, but the threshold value may be changed when another condition is satisfied. For example, the threshold value setting unit 70 may decrease the threshold value when the vehicle cabin and the outside air temperature are low. Moreover, for example, the threshold value setting unit 70 may decrease the threshold value when determination is made that the driver is in poor physical condition from the image data captured by a driver monitor that captures an image of the face of the driver.

Furthermore, various processors other than the CPU 20 may execute the process in which the CPU 20 reads and executes the program in the above-described embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor. In addition, the above processes may be executed by one of these various processors, or may be executed by a combination of two or more processors of the same kind or different kinds. For example, the processes may be executed by a plurality of FPGAs, a combination of the CPU and the FPGA, and the like. Furthermore, the hardware structure of each of the various processors is, more specifically, an electric circuit in which circuit elements such as semiconductor elements are combined.

Furthermore, in the above-described embodiment, the storage 26 and the storage 46 are configured to store various data. However, the present disclosure is not limited to this. For example, a non-transitory storage medium such as a compact disc (CD), a digital versatile disc (DVD), and a universal serial bus (USB) memory may be used as a storage unit. In this case, various programs, data, and the like are stored in these storage media.

What is claimed is:

1. A vehicle notification device configured to acquire a congestion situation of rest facilities existing on a guidance route on an expressway, acquire position information of a first rest facility that is the closest rest facility to a current location of an own vehicle and position information of a second rest facility that is the next closest rest facility to the current location following the first rest facility, among rest facilities for which determination is made that a rest is possible from the congestion situation, predict time required to move from the first rest facility to the second rest facility, when the time is more than a preset threshold value, perform notification prompting a rest at the first rest facility, determine whether occupants include a child, and when a child is included, lower the threshold value compared to a case where a child is not included.

2. The vehicle notification device according to claim 1, wherein the threshold value is able to be changed by an operation of an occupant.

3. The vehicle notification device according to claim 1, the vehicle notification device configured to acquire parking lot information of the rest facilities existing on a guidance route, and determine that a rest is possible when there is a space in which parking is possible in a parking lot from the parking lot information.

4. The vehicle notification device according to claim 1, the vehicle notification device configured to acquire image information of an entrance of each of the rest facilities existing on a guidance route, and determine that a rest is possible when the entrance is accessible.

5. A vehicle notification method comprising:

acquiring a congestion situation of rest facilities existing on a guidance route on an expressway;

acquiring position information of a first rest facility that is the closest rest facility to a current location of an own vehicle and position information of a second rest facility that is the next closest rest facility to the current location following the first rest facility, among rest facilities for which determination is made that a rest is possible from the congestion situation;

predicting time required to move from the first rest facility to the second rest facility;

when the time is more than a preset threshold value, performing notification prompting a rest at the first rest facility;

determining whether occupants include a child; and when a child is included, lowering the threshold value compared to a case where a child is not included.

6. A non-transitory storage medium storing a program that causes a computer to execute processes comprising:

acquiring a congestion situation of rest facilities existing on a guidance route on an expressway;

acquiring position information of a first rest facility that is the closest rest facility to a current location of an own vehicle and position information of a second rest facility that is the next closest rest facility to the current location following the first rest facility, among rest facilities for which determination is made that a rest is possible from the congestion situation;

predicting time required to move from the first rest facility to the second rest facility;

when the time is more than a preset threshold value, performing notification prompting a rest at the first rest facility;

determining whether occupants include a child; and when a child is included, lowering the threshold value compared to a case where a child is not included.

* * * * *